Oct. 12, 1965  R. J. BRETL  3,211,235
CONTROL SYSTEM FOR YAW CONTROL ROTORS OF HELICOPTERS
Filed Feb. 17, 1964  2 Sheets-Sheet 1

INVENTOR
ROBERT J. BRETL
BY
Jerome A. Gross,
ATTORNEY

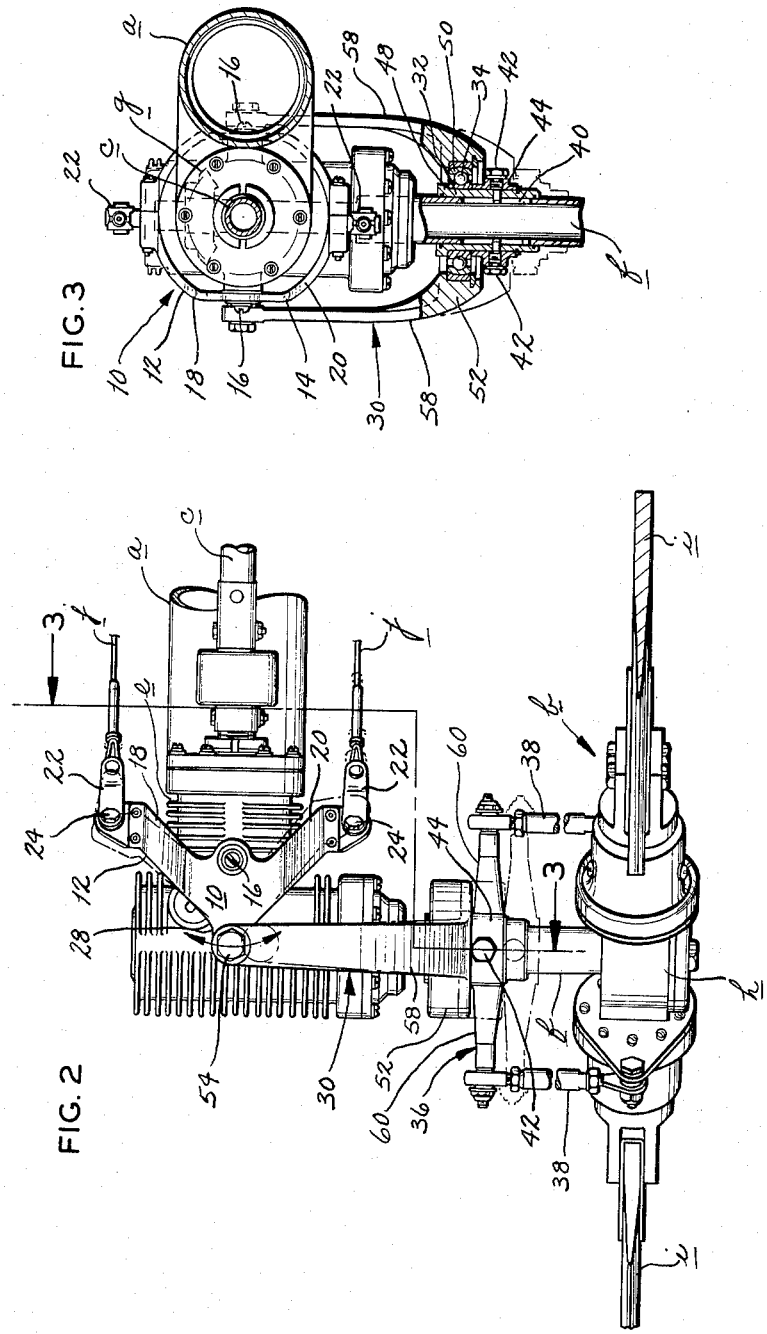

United States Patent Office 3,211,235
Patented Oct. 12, 1965

3,211,235
CONTROL SYSTEM FOR YAW CONTROL ROTORS
OF HELICOPTERS
Robert J. Bretl, Menominee, Mich., assignor to R. J.
Enstrom Corporation, Menominee, Mich., a corporation of Michigan
Filed Feb. 17, 1964, Ser. No. 345,137
3 Claims. (Cl. 170—160.46)

The present invention relates to tail rotor yaw control for a rotary wing or helicopter-type aircraft and more particularly, it relates to a tail rotor blade pitch control system mounted externally of the shaft used to transmit power to the tail rotor.

Conventional helicopter tail rotor construction employs pitch control apparatus to counteract the torque developed by the main sustaining rotor. Heretofore, such pitch control apparatus has typically included an axially-movable actuator rod supported on bearings and reciprocative within a hollow laterally-extending tail rotor shaft to convey the control forces to pitch links attached to the tail rotor blades.

Such a control mechanism requires connector linkages or the like at both ends of the actuator shaft. The components are therefore rendered somewhat complex; besides they are limited both in structural size and rigidity. These factors result in a degree of mechanical deflectance or looseness which may accumulate to produce "tail rotor buzz" and undesirable instability.

A significant disadvantage in this typical prior art construction is that the hollow shaft of the rotor is filled by the actuator rod and its bearings. To leave the shaft hollow would permit it to house supplementary wiring and conduits, as for rotor test purposes, deicing, etc.

An object of the present invention is the provision of a tail rotor blade pitch control mechanism which faciltates the transmission of control forces and movements by components which afford enhanced mechanical rigidity.

Another object is to provide a tail rotor pitch control mechanism which links pilot operable apparatus to the rotor blades and conveys control forces positively therebetween, the force transmitting path being a direct one which avoids unnecessary linkages and changes of direction of the applied forces.

Yet another object of the present invention is the provision of a tail rotor pitch control mechanism wherein the interim of the hollow drive shaft is left open to accommodate electrical wiring, deicing apparatus, or the like.

In the present invention these purposes (as well as others apparent herein) are achieved generally by providing a tail rotor control system including a unique double bell crank pivotally mounted to the tail rotor gearbox having aft extending arms positioned above and below the axis of the laterally extending tail rotor shaft. When the control cables are actuated, these aft extending arms of the bell crank rotate in an arc to which a plane through the axis of the lateral rotor shaft is tangent. A tubular cylindrical sleeve is mounted on the exterior of the rotor shaft so that it can slide axially thereon and rotate therewith. The axial positioning of this sleeve is controlled by a yoke mounted to the sleeve by a spherical bearing. The yoke has arms which extend above and below the drive shaft to engage the aft extending arms of the bell crank. Pitch links connect the sleeve to the tail rotor blades. The pivotal rotation of the bell crank imparts reciprocal axial movement to the cylindrical sleeve via the yoke and spherical bearing.

Utilization of the invention will become apparent to those skilled in the art from the disclosures made in the following description of the preferred embodiment of the invention, as illustrated in the accompanying drawings, in which:

FIG. 2 is a plan view of the tail rotor and pitch-change control apparatus of FIG. 1; and FIG. 3 is a side elevation view, partially in section, taken along the line 3—3 of FIG. 2 and illustrating the coupling arrangement of the linking members which comprise the pitch-change apparatus.

Figure 1:
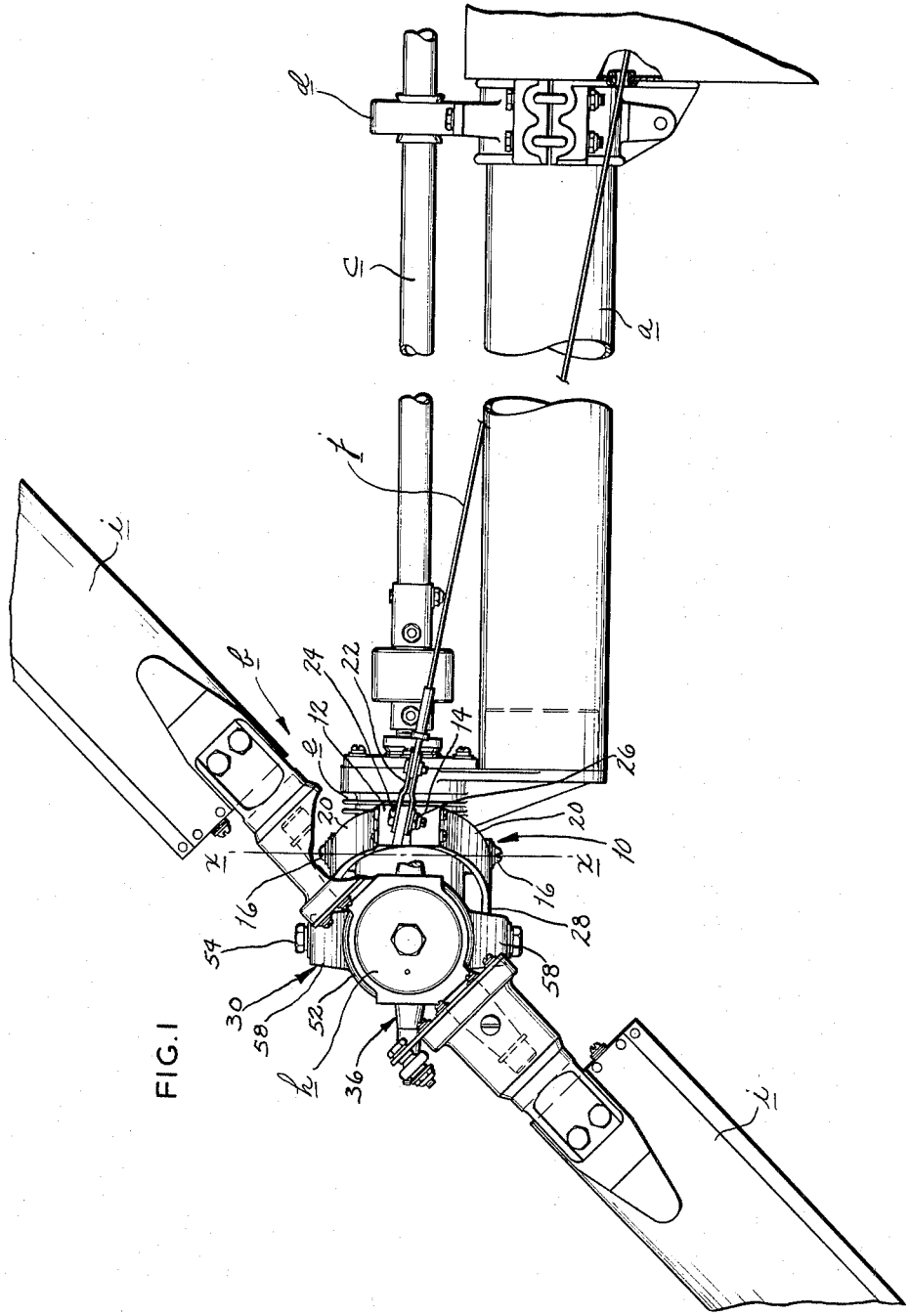
FIG. 1 is a side elevation view of a rearwardly extending fuselage boom of a helicopter, upon which is mounted the tail rotor blade and pitch-change control mechanism of the present invention.

Referring now to the drawings, wherein like reference characters designate like or corresponding parts throughout the several views, there is shown in FIG. 1 a rearward fuselage extension $a$ of a helicopter (not shown). The rearward fuselage extension $a$ is a hollow boom-like member which mounts at its aft end a yaw control tail rotor, generally designated $b$. To supply power to the tail rotor $b$, an input shaft $c$ is mounted above the rearward fuselage extension $a$ by means of a conventional bearing-support assembly $d$ bolted to the fuselage extension $a$. The longitudinal input shaft $c$ extends longitudinally rearward above the fuselage extension $a$ and terminates in a 90° gearbox $e$ bolted to the aft end of the fuselage extension $a$. Within the gearbox $e$ the input shaft $c$ is coupled to a horizontally and laterally extending rotor shaft $f$ by means of the bevel gears $g$, shown in phantom in FIG. 3.

Torque developed by the helicopter power plant is transferred via the input shaft $c$, the bevel gears $g$, and a hollow tail rotor shaft $f$ to a hub $h$ upon which the tail rotor blades $i$ are mounted for pitch-change movement. The power so transmitted is utilized by changing the pitch angle of the tail rotor blades $i$ collectively, to produce a lateral thrust sufficient to counteract the yaw of the helicopter, or to turn the helicopter about a vertical (yawing) axis.

The control apparatus includes a pair of control cables $j$ which are operated by means of pilot operated rudders. The control cables $j$ convey the control forces initiated by the pilot to an arc-describing bell crank, generally designated 10, which in turn transmits these control movements into parallel arcuate movements above and below the hollow rotor shaft $f$. These arcuate movements, as represented by the dashed line of FIG. 2, are tangent to a vertical plane passed through the axis of the hollow rotor shaft $f$. The arc-describing bell crank 10 encircles the end of the gearbox $e$ entered by the input shaft $c$. This unique double bell crank 10 consists of an upper part 12 and a lower part 14, each pivotally mounted to the forwardly extending housing portion of the 90° gearbox $e$ by means of upper and lower pivot mounting bolts 16. The pivot mounting bolts 16 are aligned to provide an axis $x$—$x$ of the arc-describing bell crank 10 which intersects the longitudinal axis of the input shaft $c$ forwardly of the hollow rotor shaft $f$. In addition, the bell crank pivot axis, so provided, is parallel to a vertical plane through the axis of the hollow rotor shaft $f$ and spaced forwardly therefrom to permit the arcuate movement referred to hereinabove.

The upper and lower parts 12 and 14 of bell crank 10 have bowed control arm portions 18 and 20, respectively, which extend symmetrically outward from the upper and lower pivot-mounting bolts 16 to both sides of this gearbox $e$ and are bowed to meet one another at approximately the level of the input shaft $c$. These outwardly extending portions 18 and 20 of the bell crank 10 are joined to each other and are acted upon by the control cables $j$ through the linking connector cable ends 22, bolts 24 and nuts 26. The bell crank 10 is further provided with two arms 28 which extend rearward from the bell crank pivot axis to terminate in ends positioned above and below the hollow rotor shaft $f$. The rearward extending arms 28 move pivotally about the bell crank axis to define two parallel arcs, both of which are tangent to a vertical plane through the axis of the hollow rotor shaft $f$.

Means are provided to engage the arc-describing bell crank 10 and the rotor blades $i$, whereby the arcuate movement of the rearward extending arms 28 is transformed into reciprocal axial movements applied outwardly of the hollow rotor shaft $f$ to the blades $i$. This arcuate motion transforming means consists of a linking yoke member 30, a cylindrical sleeve member 32, a bearing 34 which couples the yoke member 30 and the cylindrical sleeve member 32, a pitch-link operator member 36, and pitch-links 38. FIG. 1 shows the right side member 36 broken away.

The cylindrical sleeve member 32 is keyed to the hollow rotor shaft $f$ by means of the key-way slot 40 provided therein and the threaded bolt 42 threaded through the hub portion 44 of the pitch-link operator member 36. This pitch-link operator member 36 circumferentially engages the sleeve member 32. An unthreaded keying end portion of the threaded bolt 42 extends through apertures provided in the sleeve member 32 and protrudes into the key-way slot 40. This keying arrangement of the sleeve member 32 and pitch-link operator member 36 to the hollow rotor shaft $f$ transfers the rotational movement of the shaft $f$ to the sleeve member 32 and pitch-link operator member 36, while simultaneously permitting these members to reciprocate axially along the outer side of the hollow rotor shaft $f$.

At its upper end the cylindrical sleeve member 32 has an annular lip 48 which engages the bearing 34. The bearing 34 is preferably an annular spherical bearing having a conventional inner race and an outer race 50, which is contoured to permit a limited degree of universal tilting of an annular ring portion 52 of the yoke member 30 within which it is housed. Thus, it couples the sleeve member 32 and the yoke member 30 which swings through a small angle as the bell crank 10 pivots. It thus serves to urge the sleeve member 32 reciprocally along the hollow rotor shaft $f$.

In essence, the yoke member 30 is a link member; in detail, it engages the cylindrical sleeve member 32 by means of the spherical bearing 34 at its outward end and engages the rearward extending arms 28 of the arc-describing bell crank 10 by means of bolts 54 and nuts thereon. Two curved arms 58, formed integral with the annular ring portion 52 of the yoke member 30, extend inwardly therefrom above and below the hollow rotor shaft $f$ to engage the upper and lower rearward extending arms 28 of the bell crank 10. Thus, the arcuate motion of the rearward extending arms 28 is converted into reciprocal axial movement of the cylindrical sleeve member 32 by the linking yoke member 30 and spherical bearing 34.

The pitch-link operator member, generally designated 36, has two arm portions 60 which extend outwardly from the hub portion 44 and which mount at their outer ends the pitch-links 38, which engage the pitch-change crank arms $k$ of the tail rotor blades $i$ for collective pitch-change.

When pilot initiated control forces are conveyed by the control cables $j$ to the ends of the outboard extending upper and lower control arm portions 18 and 20 of the bell crank 10, the bell crank 10 pivots about axis $x$—$x$ defined by the pivot-mounting bolts 16. This pivotal movement of the bell crank 10 imparts an arcuate motion to the rearwardly extending arm 28 both above and below the hollow rotor shaft $f$. Such arcuate motion of the extending arms 28 (shown in FIG. 2 by the arrow-headed arcuate line $y$) is transformed by the linking yoke member 30 and spherical bearing 34 into forces which are applied above and below the hollow rotor tail shaft $f$ to the cylindrical sleeve member 32. As a result, the pitch-link operator member 36 is caused to move axially along the hollow tail rotor shaft $f$, thereby to actuate the crank arms $k$ and collectively vary the pitch of the tail rotor blades $i$. The axial length of the key-way slot 40 is sufficient to accommodate the entire range of pitch-change of the tail rotor blades $i$; see dashed lines in FIGS. 2 and 3.

It may be seen from the foregoing description that the present invention provides a tail rotor blade pitch control system which is mounted externally of the rotor shaft. This retains the hollow interior of the rotor shaft available for electrical wiring, or the like, and facilitates maintenance and inspection of the pitch control components.

Obviously, many modifications and variations of the present invention are visible in light of the above teachings. It is, therefore, to be understood that, within the scope of the appended claims, the invention may be practiced otherwise than as specifically described.

I claim:

1. In a helicopter of the type having a rearward fuselage extension mounting a tail rotor gearbox, a tail rotor system comprising
    a longitudinal input shaft extending rearward along the fuselage extension and terminating in the gearbox,
    a rotor shaft geared to said longitudinal input shaft within the gearbox,
    a hub mounted on said rotor shaft,
    a blade mounted on said hub for pitch-change movement,
    in combination with
    pilot operable control means,
    bell crank means pivotally mounted above and below the gearbox with its pivotal axis intersecting the axis of said input shaft, said bell crank means having portions completely encircling the gearbox and engaged sidewardly thereof by said pilot operable means and having arms extending above and below said tail rotor shaft and movable in an arc to which a plane through the axis of the rotor shaft is tangent,
    sleeve means mounted on said tail rotor shaft for rotation therewith and axial movement therealong,
    yoke means including an annular ring portion and arm portions extending therefrom above and below the tail rotor shaft to engage said arms of said bell crank means,
    said ring portion mounting an annular spherical bearing which engages said sleeve means, and
    means engaging said sleeve means and said blade for transmitting pitch-change movements to said blade.

2. In a helicopter of the type having a rearward fuselage extension mounting a tail rotor gearbox, a tail rotor pitch-change control system comprising
    a longitudinal input shaft terminating in a gearbox,
    a rotor shaft geared to said longitudinal shaft within the gearbox,
    pilot-operable control means,
    bell crank means having outboard extending portions encircling such input shaft and engaged by said pilot-operable control means, said bell crank means having a vertical pivot axis intersecting the axis of the longitudinal input shaft, said bell crank means further having aft-extending arms above and below the axis of the shaft of the rotor and movable in an arc to which a vertical plane through the axis of the rotor shaft is tangent,
    in combination with pitch control motion transforming means including
    a cylindrical sleeve axially slideable on and rotatable with the rotor shaft,
    yoke means mounting a spherical bearing within which said cylindrical sleeve rotates, said yoke means having upper and lower arms connected to the upper and lower aft-extending arms of the bell crank, and pitch-link means connected to said cylindrical sleeve and adapted to transfer axial movements of said sleeve into pitch-changing movements of the tail rotor.

3. For use with a helicopter of the type having a rearward fuselage extension mounting a yaw control rotor, the tail rotor system comprising,

- a longitudinally-extending input shaft having its aft end received in a gearbox mounted to such fuselage extension,
- a laterally extending rotor shaft having its inboard end received in said gearbox and coupled to said input shaft,
- a rotor blade driven by said rotor shaft and mounted for pitch-change movement thereon,
- arc-describing means adapted to receive pilot-actuated control movements and transmit same above and below said rotor shaft in parallel arcs to which a plane through said rotor shaft is tangent, said arc-describing means having control arm portions which extend symmetrically to both sides of the input shaft, together with
- a pair of control movement applying means connected to actuate said arc-describing means pivotally, the pivotal axis of said arc-describing means intersecting said input shaft forward of said rotor shaft,
- a first member rotatably engaged by said rotor shaft and said rotor blade for rotation therewith, said first member engaging said shaft to further permit reciprocal axial movements along said rotor shaft, and
- a second linking member engaging said first member and said arc-describing means.

References Cited by the Examiner
UNITED STATES PATENTS

| | | | |
|---|---|---|---|
| 2,225,002 | 12/40 | Focke | 170—135.22 |
| 2,385,889 | 10/45 | Skavinsky | 170—135.22 |
| 2,487,020 | 11/49 | Gilcrease | 170—160.46 |
| 2,495,453 | 1/50 | Herreshoff | 170—160.43 X |
| 2,604,949 | 7/52 | McDonald | 170—135.22 |
| 2,630,984 | 3/53 | Ballauer | 244—17.19 |
| 2,664,168 | 12/53 | Giroz | 170—160.46 X |
| 3,006,418 | 10/61 | Spielman | 170—160.24 |

FOREIGN PATENTS

| | | |
|---|---|---|
| 137,048 | 5/47 | Australia. |
| 988,872 | 5/51 | France. |

JULIUS E. WEST, *Primary Examiner.*